US009130360B2

(12) United States Patent
Asao

(10) Patent No.: US 9,130,360 B2
(45) Date of Patent: Sep. 8, 2015

(54) ELECTRICAL JUNCTION BOX

(75) Inventor: Takahiro Asao, Yokkaichi (JP)

(73) Assignee: SUMITOMO WIRING SYSTEMS, LTD., Yokkaichi (JP)

(*) Notice: Subject to any disclaimer, the term of this patent is extended or adjusted under 35 U.S.C. 154(b) by 1111 days.

(21) Appl. No.: 12/891,127

(22) Filed: Sep. 27, 2010

(65) Prior Publication Data

US 2011/0094792 A1 Apr. 28, 2011

(30) Foreign Application Priority Data

Oct. 28, 2009 (JP) ................................. 2009-248270

(51) Int. Cl.
*H01R 13/46* (2006.01)
*H01H 9/02* (2006.01)
*H02G 3/08* (2006.01)
*B60R 16/02* (2006.01)

(52) U.S. Cl.
CPC . *H02G 3/08* (2013.01); *B60R 16/02* (2013.01)

(58) Field of Classification Search
CPC .................................. H02G 3/08; B60R 16/02
USPC ........................................................ 174/520
See application file for complete search history.

(56) References Cited

U.S. PATENT DOCUMENTS

| 6,778,402 | B2* | 8/2004 | Nasu et al. ..................... 361/756 |
| 7,075,006 | B2* | 7/2006 | Nojima et al. .................. 174/58 |
| 7,459,630 | B2* | 12/2008 | Pinol Pedret et al. ........... 174/50 |
| 2004/0017667 | A1* | 1/2004 | Nasu et al. ..................... 361/752 |
| 2005/0145409 | A1* | 7/2005 | Terada .............................. 174/58 |
| 2005/0269121 | A1* | 12/2005 | Ikeda et al. ..................... 174/58 |
| 2008/0200045 | A1* | 8/2008 | Akahori et al. ............... 439/76.2 |
| 2010/0326690 | A1* | 12/2010 | Ejima ............................. 174/50 |

FOREIGN PATENT DOCUMENTS

| JP | A-63-100883 | 5/1988 |
| JP | A-4-136885 | 5/1992 |
| JP | A-9-8469 | 1/1997 |
| JP | A-2007-104814 | 4/2007 |

* cited by examiner

*Primary Examiner* — Timothy Thompson
*Assistant Examiner* — Rhadames J Alonzo Miller
(74) *Attorney, Agent, or Firm* — Oliff PLC

(57) ABSTRACT

To provide an electrical junction box equipped with a bracket having a new structure that can stably and strongly secure the electrical junction box to a vehicle body to exert sufficient strength against an external force applied by bolt-fastening of a terminal hardware in an external wiring. A separate bracket attaches an electrical junction box main body to a vehicle body side support member. The separate bracket is provided with latch portions. Fixing positions between the latch portions and the electrical junction box main body are set on both sides of bolt connecting sections along the vehicle body side support member.

5 Claims, 3 Drawing Sheets

ELECTRICAL JUNCTION BOX

BACKGROUND

This application claims priority to JP 2009-248270 filed in Japan on Oct. 28, 2009, the entire disclosure of which is hereby incorporated by reference herein in its entirety.

TECHNICAL FIELD

The exemplary embodiments relate to an electrical junction box to be mounted on a motor vehicle, and more particularly relates to an electrical junction box provided with a bracket that supports and secures an electrical junction box main body to a vehicle body panel or the like.

BACKGROUND ART

It is well-known that an electrical junction box mounted on a motor vehicle is formed into a hollow structure made of synthetic resin and has electrical current conductive components such as bus bars, connectors, and fuses incorporated in the electrical junction box to form internal circuits. External wirings for supplying an electrical power to the internal circuits are attached to the electrical junction box by securing terminal hardwares of the external wirings to the electrical junction box by bolts.

Such electrical junction box has been disclosed in JUM SHO 63(1988)-100883 A and JUM HEI 4(1992)-136885 A. The electrical junction box is secured to a support wall of an engine room or a passenger room. That is, the one side surface out of an outer periphery of the electrical junction box is opposed to the support wall of the engine room or the passenger room and the one side is secured to the support wall by bolts or latch pieces.

However, there are many cases where a conventional support structure of the electrical junction box cannot obtain satisfactory support strength. Particularly, a terminal hardware for a large diameter external wire is secured to the electrical junction box by bolts after the electrical junction box is attached to the support wall. In addition, since a fastening torque is great, only plural fixing portions on the side surface of the box opposed to the support wall are likely to lack strength. Consequently, there is a possibility that deformations or breakages may be caused in the electrical junction box, a bracket, or the like at the fixing portions of the electrical junction box on the support wall.

JP HET 9(1997)-8469 A has disclosed a bracket hardware provided with a latch portion that is engaged with a bottom surface of an electrical junction box and protrudes from a central part of a flat side plate provided with a latch portion to be engaged with the support wall. However, it is difficult to protrude a bottom plate portion from the central part of the side plate in such bracket hardware, thereby making it difficult to produce the bracket. In addition, the terminal hardware is screwed on an upper surface of the electrical junction box, a fastening force exerted by a bolt to the terminal hardware is applied to the latch portion on the central part of the bottom surface near a rotary central axis of the bolt. A sufficient reinforcing effect cannot be expected in the latch portion.

SUMMARY

In view of the above problems, an object of the present invention is to provide an electrical junction box equipped with a bracket having a new structure that can stably and strongly secure the electrical junction box to a vehicle body to exert sufficient strength against an external force applied by bolt-fastening of a terminal hardware in an external wiring.

A first aspect of the exemplary embodiments is directed to an electrical junction box. The electrical junction box in the first aspect includes: an electrical junction box main body having an upper surface; a bolt connecting section provided on the upper surface of the electrical junction box main body; an external wiring having a terminal fitting fastened to and fixed on the bolt connecting section; and a bracket incorporated in the electrical junction box main body for attaching the main body to the vehicle body side support member, wherein the bracket includes an L-shaped base plate section having a flat lateral plate portion that extends along the vehicle body side support member, and a projecting plate portion that is bent from one end of the lateral plate portion in its longitudinal direction and protrudes in a direction apart from the vehicle body side support member, and wherein the lateral plate portion and projecting plate portion are each provided with latch portions for securing the bracket to the electrical junction box main body, the latch portion of the lateral plate portion of the bracket being positioned on one side of the electrical junction box main body beyond the bolt connecting section in a longitudinal direction of the lateral plate portion, and the latch portion of the projecting plate portion of the bracket being disposed on an other side of said electrical junction box main body.

According to the electrical junction box in the first aspect of the exemplary embodiments, the latch portions are disposed on the bracket at the opposite sides of the connecting bolts. Accordingly, strength of the electrical junction box main body against the bolt-fastening external force can be efficiently reinforced by the bracket. Consequently, it is possible to prevent the electrical junction box main body from being broken.

The plural reinforcing positions due to the bracket are efficiently set to be at a relatively short distance (both sides of the bolts) from rotary central axes of the connecting bolts to the bracket latching positions. Accordingly, moments applied to the reinforcing positions (latch positions) of the bracket become relatively small and are distributed uniformly. As a result, it is possible to effectively prevent the latching and fixing positions between the bracket and the electrical junction box main body.

A second aspect of the exemplary embodiments is directed to the electrical junction box according to the first aspect. In the electrical junction box in the second aspect, the electrical junction box main body is provided with engaging sections that are open downward, and under the condition that the electrical junction box main body is attached to the bracket from an upper side, the latch portions of the bracket are inserted into and secured to the engaging sections of the electrical junction box main body.

According to the electrical junction box in the second aspect of the exemplary embodiments, an assembling work between the respective latch portions and the engaging sections of the electrical junction box main body can be finished by means of the downward inserting structure, thereby enhancing workability.

A third aspect of the exemplary embodiments is directed to an electrical junction box that includes: an electrical junction box main body having an upper surface; a bolt connecting section provided on the upper surface of the electrical junction box main body; an external wiring having a terminal fitting fastened to and fixed on said bolt connecting section; and a bracket incorporated in the electrical junction box main body for attaching the main body to the vehicle body side support member, the bracket having a lateral plate portion and a projecting plate portion, the lateral plate portion and projecting plate portion are each provided with latch portions for securing the bracket to the electrical junction box main body, the latch portion of the lateral plate portion of the bracket being positioned on one side of the electrical junction box main body beyond the bolt connecting section in a longitudinal direction of the lateral plate portion, and the latch portion of the projecting plate portion of the bracket being disposed on an other side of said electrical junction box main body.

A fourth aspect of the exemplary embodiments is directed to an electrical junction box according to the third aspect. In the electrical junction box in the fourth aspect, the electrical junction box's lateral plate portion is provided with two latch projecting pieces that are spaced apart from each other in a longitudinal direction, the two latch projecting pieces protruding in a same direction from the lateral plate portion, one of the latch projection pieces is provided on one end of the lateral plate portion and the other latch projecting piece is provided at a center of the lateral plate portion.

A fifth aspect of the exemplary embodiments is directed to an electrical junction box according to the fourth aspect. In the electrical junction box in the fifth aspect, the electrical junction box's latch projecting pieces each include an aperture.

According to the exemplary embodiments, the latch portions of the separate bracket are secured to the electrical junction box main body at the opposite sides of the bolt connecting section in the direction along the vehicle body side support member. Thus, the electrical junction box main body can exert sufficient strength against the external force caused by bolt-fastening of the terminal hardware of the external wiring. Consequently, it is possible to stably and strongly mount the electrical junction box on the vehicle body.

DETAILED DESCRIPTION OF EMBODIMENTS

Figure 1:
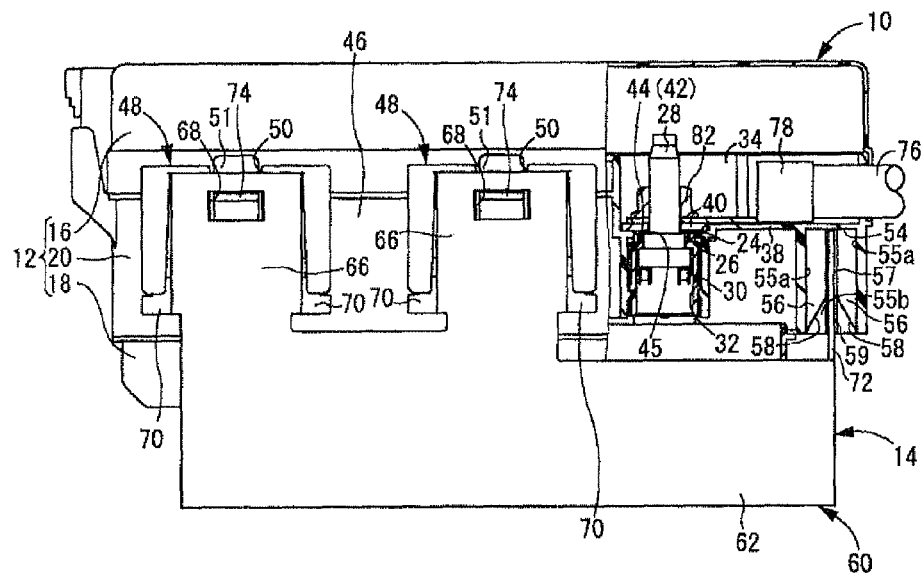
FIG. 1 is a partially broken side view of an embodiment of an electrical junction box.

Referring now to the drawings, embodiments of the present invention will be described below.

Figure 2:
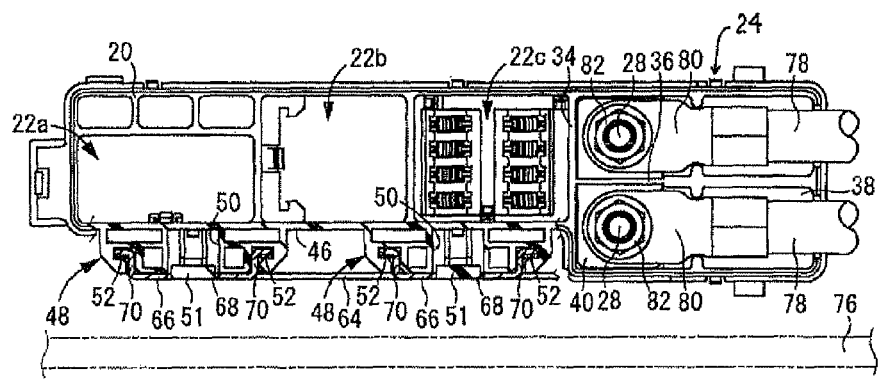
FIG. 2 is a partially broken top plan view of the electrical junction box shown in FIG. 1, illustrating the electrical junction box from which an upper cover is removed.
Figure 3:
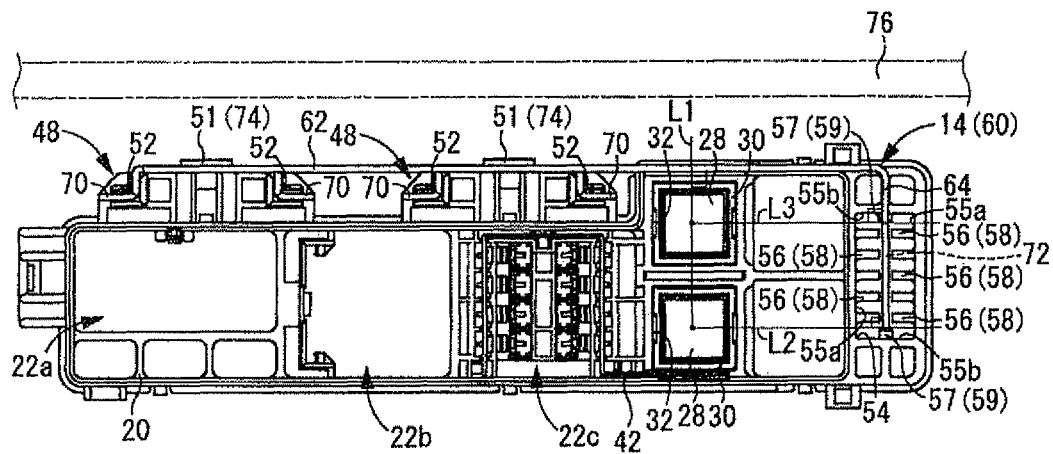
FIG. 3 is a bottom view of the electrical junction box shown in FIG. 1, illustrating the electrical junction box from which a lower cover is removed.

FIGS. 1 to 3 show an embodiment of an electrical junction box 10 in accordance with the exemplary embodiments. The electrical junction box 10 includes an electrical junction box main body 12 and a separate bracket 14 attached to the main body 12. Hereinafter, a vertical direction designates upper and lower directions in FIG. 1 in principle.

Specifically, as shown in FIG. 1, the electrical junction box main body 12 includes a main body block 20, an upper cover 16 attached to the main body block 20 from it upper side, and a lower cover 18 attached to the main body block 20 from its lower side and is formed into a rectangular block-like configuration, as a whole.

The upper cover 16 may be incorporated in an upper part of the main body block 20 to cover the block 20 from the upper side.

The lower cover 18 may be incorporated in a lower part of the main body block 20 to cover the block 20 from the lower side except an engaging recess 54 mentioned after.

The main body block 20 is provided with electrical component mounting sections 22a to 22c on which electrical components such as connectors, relays, and fuses are mounted. The sections 22a to 22c are arranged on a line from an end of the main body block 20 in its longitudinal direction (right and left directions in FIG. 2). A bus bar 42 mentioned after is contained in the main body block 20 to serve as an electrical current conductive member. Electrical powers distributed from the bus bar are supplied to external electrical equipments through electrical cables connected to the respective electrical components.

A plurality of fuses (not shown) are mounted on the electrical component mounting section 22c. The main body block 20 is provided with a rectangular plate-like bolt mounting section 24 on the other end (on the right side in FIG. 2) beyond the electrical component mounting section 22c in a longitudinal direction of the block 20. The bolt mounting section 24 is provided with two bolt receiving apertures 26 and 26 juxtaposed in a width direction (upper and lower directions in FIG. 2) of the block 20. Bolts 28 and 28 are inserted into the bolt receiving apertures 26 and 26 from a lower side.

A bolt cover 30 is attached to a head portion of each bolt 28. Each bolt 28 is inserted in each bolt receiving aperture 26 with the bolt cover 30 being prevented from disengaging from each bolt containing aperture 32 provided in a lower part of the bolt mounting section 24. Each bolt 28 protrudes from the upper surface of the bolt mounting section 24. Under this condition, each bolt 28 can move slightly in both upper and lower directions in FIG. 1.

The bolt mounting section 24 is provided on its upper surface with a peripheral wall 34 that surrounds the two bolts 28 and 28 at three sides and with a partition wall 36 that is disposed inside the peripheral wall 34 and partitions the adjacent two bolts 28 and 28. The peripheral wall 34 and partition wall 36 extend to an upper surface of an electrical cable support section 38 that extends from the bolt mounting section 24 to the other end of the main body block 20 in its longitudinal direction.

A connecting plate 40 that bridges the two bolts 28 and 28 is disposed on the upper surface of the bolt mounting section 24. The connecting plate 40 is inserted into slits (not shown) provided in a proximal end portion of each of the peripheral wall 34 and the partition wall 36 to be disposed on the upper surface of the bolt mounting section 24, before the bolts 28 and 28 are inserted into the bolt receiving apertures 26 and 26.

A bus bar 42 that distributes an electrical power to the plural fuses mounted on the electrical component mounting section 22c is incorporated in the main body block 20 from the lower side. A terminal portion 44 is disposed in the one bolt receiving aperture 26 and the bus bar 42 is superimposed on the connecting plate 40, with the bus bar 42 being incorporated in the main body block 20. The one bolt 28 is inserted into a bolt receiving aperture 45 in the terminal portion 44. Before the bolts 28 and 28 are inserted into the bolt receiving apertures 26 and 26, the bus bar 42 is incorporated in and secured to the main body block 20.

The main body block 20 is provided with two engaging lock portions 48 on the one end side (on the left side in FIG.

2) beyond the bolt mounting section 24 in the longitudinal direction of the block 20 and on a side surface 46 at the one end side (the lower side in FIG. 2) in the width direction of the block 20. Each engaging lock portion 48 protrudes from the side surface 46 and is formed into a block-like configuration, as a whole. The engaging lock portion 48 is provided on a projecting end surface with a central groove 50 that extends in a height direction (upper and lower directions) of the main body block 20. Each central groove 50 is provided with a plate-like elastic latch piece 51 that extends from the one end in a groove width direction toward the other end (from an upper side of the main body block 20 to a lower side).

The engaging lock portion 48 is provided on each of both side walls of each central groove 50 with an engaging groove 52 that serves as an engaging section. Each engaging groove 52 is open at not only the projecting end surface of the engaging lock portion 48 but also the lower side of the main body block 20.

The main body block 20 is provided on a lower side of the electrical cable support portion 38 with an engaging recess 54 that serves as an engaging section and is open downward. The engaging recess 54 is open in a substantially rectangular shape in cross section. A dimension of the engaging recess 54 in the width direction of the main body block 20 is set to be larger than a dimension in the longitudinal direction of the block 20.

The engaging recess 54 is provided on each of a pair of wall surfaces 55a and 55a opposed to each other in the longitudinal direction of the main body block 20 with rib projections 56 that protrude toward each of the opposed wall surfaces 55a and 55a. The rib projections 56 and 56 provided on the one wall surface 55a and the other wall surface 55a are disposed on the same positions in the width direction of the main body block 20 and the projecting end surfaces of the rib projections 56 and 56 are opposed to each other in the longitudinal direction of the main body block 20. Thus, a given clearance is defined between the rib projections 56 and 56 opposed to each other in the longitudinal direction of the main body block 20.

The engaging recess 54 is provided on each of the pair of wall surfaces 55b and 55b opposed to each other in the width direction of the main body block 20 with a rib projection 57 that protrudes toward each of the opposed wall surfaces 55b and 55b. The rib projections 57 and 57 are disposed on the same positions in the longitudinal direction of the main body block 20 and pass through the clearance between the rib projections 56 and 56 opposed to each other in the longitudinal direction of the main body block 20 to be opposed to each other in the width direction of the main body block 20. Thus, the position where a latch piece 72 mentioned after is inserted into the engaging recess 54 is restrained by the rib projections 56 and 57.

Slant surfaces 58 and 59 are provided on the projecting end portions of the rib projections 56 and 57 at the open side of the engaging recess 54 to guide the latch piece 72 into a given inserting position. This facilitates the insertion of the latch piece 72 into the engaging recess 54.

A width of each rib projection 57 is set to be the substantially same as the clearance between the rib projections 56 and 56 opposed to each other in the longitudinal direction of the main body block 20. Thus, even if the latch piece 72 is inserted into the engaging recess 54 at a shifted position in the longitudinal direction of the main body block 20, it is possible to stably clamp the latch piece 72 by the rib projections 57 and 57.

When the upper cover 16 and lower cover 18 are incorporated in the main body block 20 constructed above from the upper and lower sides, the electrical junction box main body 12 are assembled. At this time, the engaging recess 54 provided in the main body block 20 is not covered with the lower cover 18 and is open in a downward direction.

Figure 4:
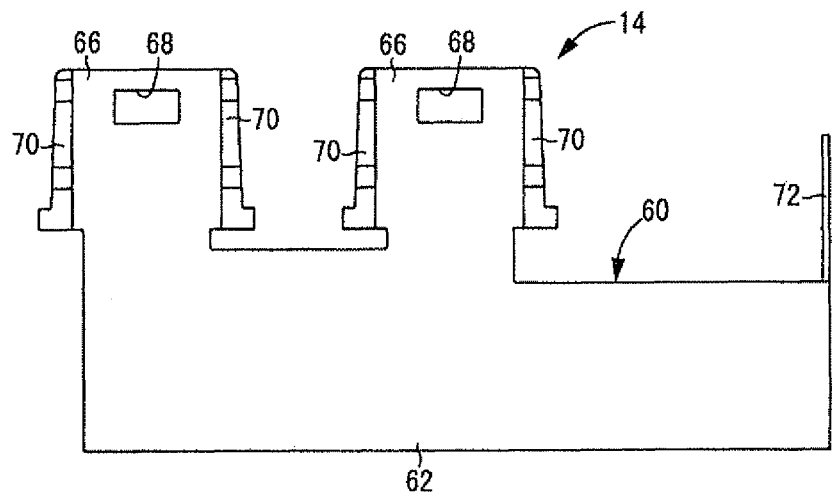
FIG. 4 is a front elevation view of a separate bracket that constitutes the electrical junction box shown in FIG. 1.
Figure 5:
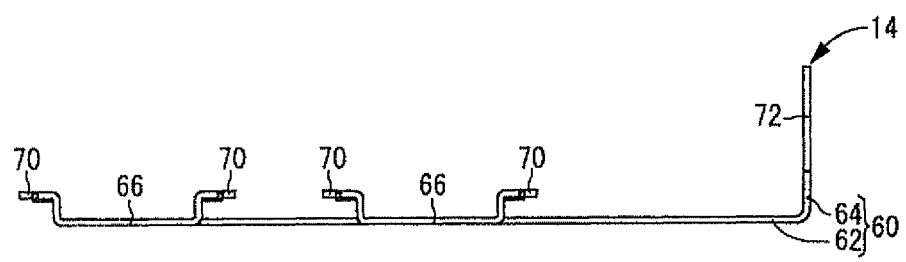
FIG. 5 is a plan view of the separate bracket shown in FIG. 4.
Figure 6:
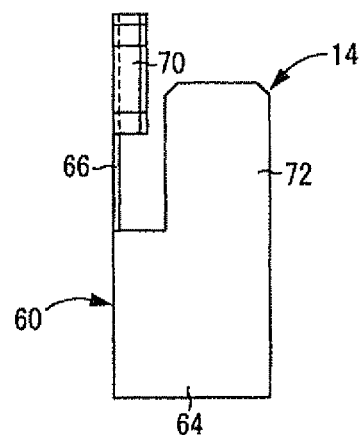
FIG. 6 is a side elevation view of the separate bracket shown in FIG. 4.

As shown in FIGS. 4 to 6, the separate bracket 14 includes a base plate section 60. The base plate section 60 includes a straight flat lateral plate portion 62, a projecting plate portion 64 that extends in a latitudinal directional, from one end of the lateral plate portion 62. The plate portions 62 and 64 are integrated with the base plate section 60. The base plate section 60 may be formed into an L-shaped configuration.

The lateral plate portion 62 is provided with two latch projecting pieces 66 and 66 that serve as a latch section and are spaced apart from each other in the longitudinal direction. The two latch projecting pieces 66 and 66 protrude upward and are integrated with the lateral plate portion 62. Each latch projecting piece 66 is formed into a rectangular plate-like configuration, as a whole. The one latch projection piece 66 is provided on the other end of the lateral plate portion 62 in its longitudinal direction while the other latch projecting piece 66 is provided on a central part of the lateral plate portion 62 in its longitudinal direction.

Each latch projecting piece 66 is provided near its distal end with a latch aperture 68 that penetrates a thickness of the piece 66. The latch projecting piece 66 is provided on its opposite ends in the width direction with a guide piece 70 that protrudes outward in the width direction and is bent in a crank-like shape.

A portion between the two latch projecting pieces 66 on the lateral plate portion 62 has a narrower width than the other portions. Thus, the portion between the two latch projecting pieces 66 on the lateral plate portion 62 is reinforced.

The projecting plate portion 64 is provided with a latch piece 72 that serves as a latch section. The latch piece 72 protrudes upward from the projecting plate portion 64 and is integrated with the plate portion 64. The latch piece 72 is formed into a rectangular plate-like configuration, as a whole. The latch piece 72 is provided on an extending end of the projecting plate portion 64.

The separate bracket constructed above is incorporated in the electrical junction box main body 12 from the lower side. At this time, when the guide pieces 70 and 70 inserted from the lower side into the engaging grooves 52 and 52 in the engaging lock portions 48 and 48 of the main body block 20 move upward in the engaging grooves 52 and 52, the latch projecting pieces 66 and 66 on the lateral plate portion 62 of the separate bracket 14 move along the projecting end surfaces of the engaging lock portions 48. When the latch projections 74 and 74 on the plate-like elastic latch pieces 51 and 51 are engaged with inner peripheries of the latch apertures 68 and 68 in the latch projecting pieces 66 and 66, the latch projecting pieces 66 and 66 are engaged with and secured to the engaging lock portions 48 and 48.

The latch piece 72 on the projecting plate portion 64 of the separate bracket 14 is inserted from the lower side into the engaging recess 54 in the main body block 20. At this time, the latch piece 72 is disposed between the pair of rib projections 56 and 56 opposed to each other in the longitudinal direction of the main body block 20 and is clamped between the pair of rib projections 57 and 57 opposed to each other in the width direction of the main body block 20. The projecting end surface of the latch piece 72 is superimposed on the bottom surface of the engaging recess 54. Thus, the latch piece 72 is secured to the main body block 20 with the latch piece 72 being inserted in the engaging recess 54.

When the separate bracket 14 constructed above is incorporated in the electrical junction box main body 12, the electrical junction box 10 in the present embodiment is completed.

When the separate bracket 14 is incorporated in the electrical junction box main body 12, the lateral plate portion 62 extends in the longitudinal direction of the electrical junction box main body 12. Thus, a straight line L1 (FIG. 3) that passes the central axis of each bolt 28 and extends in the width direction of the electrical junction box main body 12 intersects the lateral plate portion 62 substantially in perpendicular. That is, the lateral plate portion 62 extends on a tangential line of a circle about a center of each bolt 28.

The projecting plate portion 64 extends in the width direction of the electrical junction box main body 12. Thus, a line L2 (FIG. 3) that passes a central axis of the one bolt 28 and extends in the longitudinal direction of the electrical junction box main body 12 and a line L3 (FIG. 3) that passes a central axis of the other bolt 28 and extends in the longitudinal direction of the electrical junction box main body 12 intersect the projecting plate portion 64 perpendicularly. That is, the projecting plate portion 64 extends on a tangential line of a circle about a center of each bolt 28.

When the separate bracket 14 is attached to the vehicle body side support member 76 such as a side wall of an engine room or a passenger room, the electrical junction box 10 constructed above is mounted on a given position in the engine room or the like. Under this condition, the side surface of the main body block 20 that constitutes the electrical junction box main body 12 is opposed to the vehicle body side support member 76. The lateral plate portion 62 extends straightly along the vehicle body side support member 76 and the projecting plate portion 64 protrudes in a direction spaced away from the member 76. A process for attaching the separate bracket 14 to the vehicle body side support member 76 may adopt, for example, a process in which a suitable bolt inserting aperture (not shown) is provided in the base plate section 60 and a fixing bolt is inserted into the bolt inserting aperture, or a process in which a suitable attaching piece (not shown) is provided in the base plate section 60 and the attaching piece is secured to the member 76.

When the upper cover 16 is removed from the main body block 20, a terminal hardware 80 of an external wiring 78 (FIG. 2) is coupled to each bolt 28 and is superimposed on the connecting plate 40. Then, the external wiring 78 is disposed above the electrical cable support section 38 and extend in the longitudinal direction of the electrical junction box main body 12. Under this condition, a nut is screwed on each bolt 28 and the nut is fastened on the bolt 28. Thus, the terminal hardware 80 is secured to each bolt 28. It will be apparent from the foregoing that a bolt connecting section includes the bolt mounting section 24, the bolts 28, and the nuts 82.

After each terminal hardware 80 of each external wiring 78 is secured to each bolt 28, the upper cover 16 is incorporated in the main body block 20, the external wiring 78 is attached to the electrical junction box 10 mounted on the vehicle body support member 76.

In the electrical junction box constructed above, the latch projecting pieces 66, 66 and the latch piece 72 provided on the separate bracket secure the bolt mounting section 24 to the electrical junction box main body 12 at the opposite sides of the main body 12 in its longitudinal direction. Thus, strength of the electrical junction box main body 12 against a fastening force of the nut 82 can be obtained by the separate bracket 14. In result, it is possible to avoid deformation and breakage of the engaging block portion 48 upon fastening of the nut 82.

Accordingly, it is possible to strongly and stably attach the electrical junction box 10 to the vehicle body side support member 76.

Particularly, since the latch piece 72 on the projecting plate portion 64 is secured to the electrical junction box main body 12 with the projecting plate portion 64 of the separate bracket 14 extending on the tangential line of the circle about the center of the bolt 28, it is possible to easily obtain strength of the electrical junction box main body 12 against the fastening force of the nut 82. Consequently, it is possible to more effectively prevent the engaging lock portion 48 from being deformed and broken upon fastening of the nut 82.

It is possible to fix the separate bracket 14 to the electrical junction box main body 12 merely by inserting the electrical junction box main body 12 into the separate bracket 14 from the upper side. Thus, it is possible to enhance an assembling work between the separate bracket 14 and the electrical junction box main body 12.

Because the electrical junction box main body 12 is incorporated in the separate bracket 14 from the upper side, it is possible to obtain strength of the electrical junction box main body 12 (the main body block 20) against a downward external force upon fastening of the nut 82.

Because the latch piece 72 on the separate bracket 14 is inserted into and secured to the engaging recess 54 that is open at the lower part of the main body block 20, it is possible to avoid upsizing of the electrical junction box main body 12 as well as the main body block 20. It is also possible to obtain a space for fixing the latch piece 72.

Although the present invention is described in the embodiments in detail, it should be noted that the present invention is not limited to the above embodiments. For example, the bolt 28 may be embedded in the main body block 20, or the bolt 28 is screwed in and secured to a threaded aperture in the main body block 20.

Also, the nut may be embedded in the main body block 20, the bolt may be screwed into the nut, and the terminal hardware 80 of the external wiring 78 may be fastened by the bolt.

What is claimed is:

1. An electrical junction box for connecting to a vehicle body side support member, the electrical junction box comprising:
    an electrical junction box main body having an upper surface;
    a bolt connecting section provided on the upper surface of the electrical junction box main body;
    an external wiring having a terminal fitting fastened to and fixed on the bolt connecting section; and
    a bracket incorporated in the electrical junction box main body for attaching the main body to the vehicle body side support member, wherein
        the bracket includes
            an L-shaped base plate section having a flat lateral plate portion that extends along the vehicle body side support member, and
            a projecting plate portion that is bent from one end of the lateral plate portion in its longitudinal direction and protrudes in a direction apart from the vehicle body side support member,
        the lateral plate portion and projecting plate portion are each provided with latch portions for securing the bracket to the electrical junction box main body, the latch portion of the lateral plate portion of the bracket being positioned on one side of the electrical junction box main body beyond the bolt connecting section in a longitudinal direction of the lateral plate portion, and the latch portion of the projecting plate portion of the bracket being disposed on an other side of said electrical junction box main body, and each of the latch portions of the lateral plate portion of the bracket includes a guide piece that protrudes outwardly from the lateral plate portion in a width direction and is bent in a crank-like shape.

2. An electrical junction box according to claim 1, further comprising:

engaging sections that are open downward, and under the condition that the electrical junction box main body is attached to the bracket from an upper side, the latch portions of the bracket are inserted into and secured to the engaging sections of the electrical junction box main body.

3. An electrical junction box for connecting to a vehicle body side support member, the electrical junction box comprising:

an electrical junction box main body having an upper surface;

a bolt connecting section provided on the upper surface of the electrical junction box main body;

an external wiring having a terminal fitting fastened to and fixed on said bolt connecting section; and a bracket incorporated in the electrical junction box main body for attaching the main body to the vehicle body side support member, the bracket having a lateral plate portion and a projecting plate portion, the lateral plate portion and projecting plate portion are each provided with latch portions for securing the bracket to the electrical junction box main body, the latch portion of the lateral plate portion of the bracket being positioned on one side of the electrical junction box main body beyond the bolt connecting section in a longitudinal direction of the lateral plate portion, and the latch portion of the projecting plate portion of the bracket being disposed on an other side of said electrical junction box main body, wherein each of the latch portions of the lateral plate portion of the bracket includes a guide piece that protrudes outwardly from the lateral plate portion in a width direction and is bent in a crank-like shape.

4. An electrical junction box according to claim 3, wherein the lateral plate portion includes two latch projecting pieces that are spaced apart from each other in a longitudinal direction, the two latch projecting pieces protruding in a same direction from the lateral plate portion, one of the latch projection pieces is provided on one end of the lateral plate portion and the other latch projecting piece is provided at a center of the lateral plate portion.

5. An electrical junction box according to claim 4, wherein each of the latch projecting pieces include an aperture.

* * * * *